United States Patent [19]

O'Neal et al.

[11] Patent Number: 5,046,331
[45] Date of Patent: Sep. 10, 1991

[54] EVAPORATIVE CONDENSER

[75] Inventors: Robert G. O'Neal; Kenneth E. Vogel, both of Yuma, Ariz.

[73] Assignee: Russell A Division of Ardco, Inc., Brea, Calif.

[21] Appl. No.: 384,839

[22] Filed: Jul. 25, 1989

[51] Int. Cl.⁵ ............................................. F28D 5/00
[52] U.S. Cl. ..................................... 62/304; 62/305; 62/310; 62/314; 165/163
[58] Field of Search ................. 62/305, 515, 304, 314, 62/310; 165/184, 118, 163, 900

[56] References Cited

U.S. PATENT DOCUMENTS

| | | | |
|---|---|---|---|
| 521,783 | 6/1894 | Cox | 62/314 |
| 1,949,522 | 3/1934 | Williams | 62/314 X |
| 2,737,789 | 3/1956 | Ruff | 62/310 X |
| 2,859,946 | 11/1958 | Bayle et al. | 62/314 X |
| 3,114,786 | 12/1963 | Macrow et al. | 62/304 X |
| 3,139,067 | 6/1964 | Broek et al. | 165/163 X |
| 3,212,571 | 10/1965 | Romanos | 165/163 |
| 3,809,061 | 5/1974 | Gerstmann | 165/163 X |
| 4,404,814 | 9/1983 | Beasley et al. | 62/305 X |
| 4,757,695 | 7/1988 | Malnar | 62/305 |

Primary Examiner—Lloyd L. King

[57] ABSTRACT

An evaporative condenser having a cylindrical fiberglass housing which provides a circumferential air flow across a plurality of concentrically oriented spiral condensing coils. The planar spiral coils are generated through the compression of a conical winding of tubing formed about a multi-tiered platform, to form an evenly-spaced spiral condensing coil. Each layer of tubing is affixed to a plurality of radial braces, which provide the evaporative coils with sufficient structural integrity to be individually employed. A method and apparatus for producing spiral coils having uniform spacing between adjacent revolutions.

20 Claims, 3 Drawing Sheets

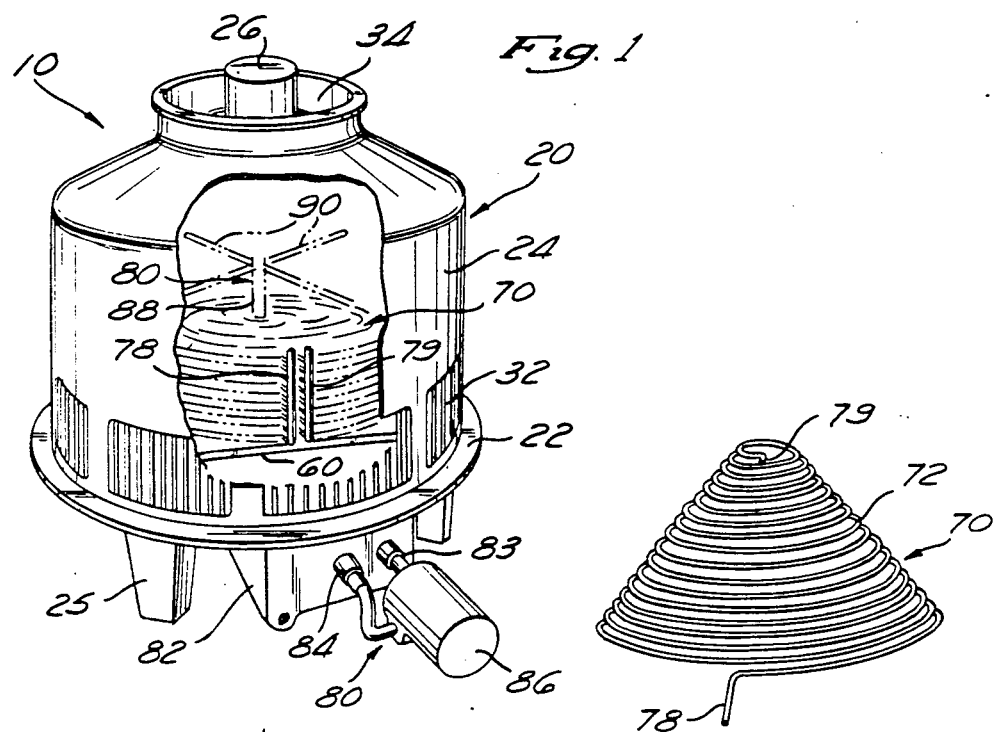
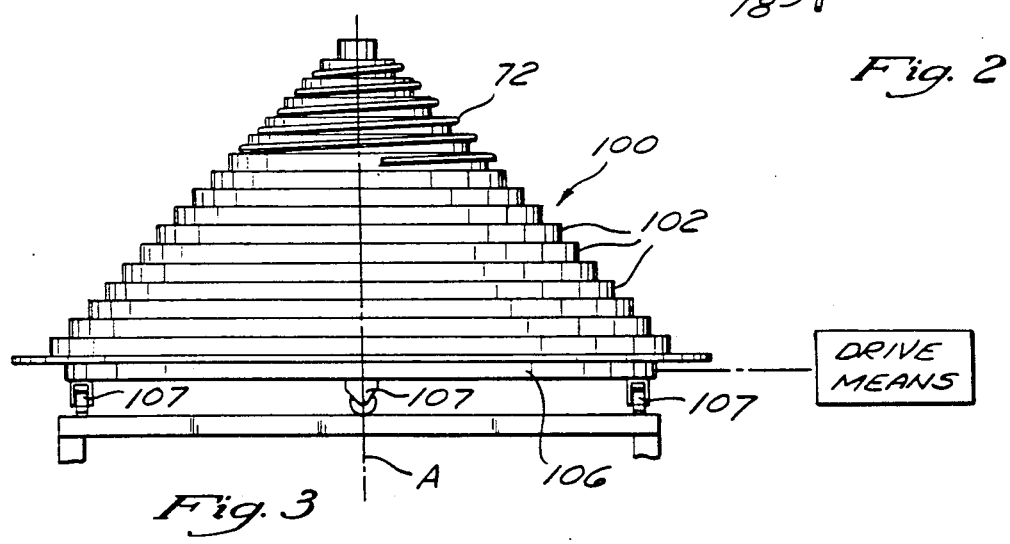
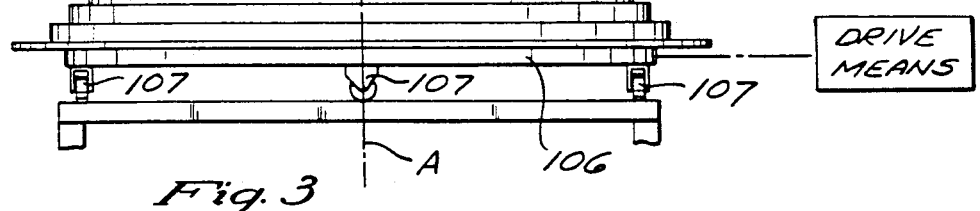
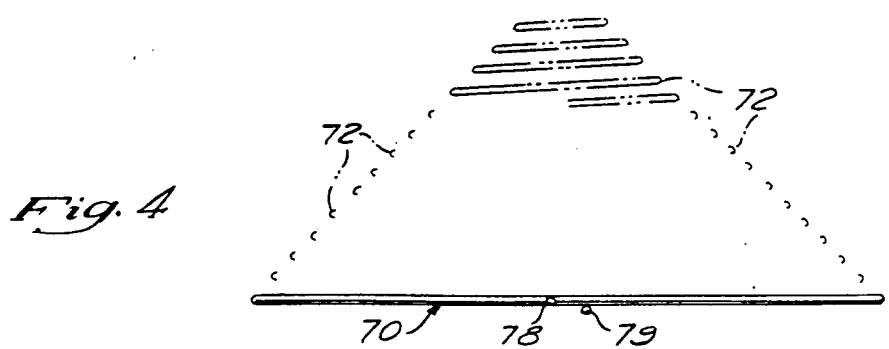

EVAPORATIVE CONDENSER

BACKGROUND OF THE INVENTION

This invention relates to air-conditioning and refrigeration systems, and more particularly to the evaporative condensers used for cooling the refrigerant media of such systems.

DESCRIPTION OF THE PRIOR ART

Evaporative condensers combine a refrigerant condenser with an atmospheric cooling tower to cool the refrigerant of air-conditioning and refrigeration systems. The evaporative condenser employs the evaporation of water to extract heat from the refrigerant. The refrigerant is passed through a length of condenser tubing, having a wetted surface which is exposed to an air current, to promote the evaporation of the water and thereby cool the refrigerant.

Traditional evaporative condensers employ large rectangular volumes having a metallic shell to enclose linear lengths of parallel tubing through which the refrigerant passes. A sprinkler system wets the outside surface of the tubing, and fans disposed beneath the tubing force air across the wetted surface to evaporatively cool the tubing and refrigerant. Evaporative condensers having steel housings and parallel linear condenser tubing are easy to manufacture and, therefore, cost efficient in production. However, the steel of the condenser housing is subject to corrosion resulting from the build-up of chemicals as the water evaporates. In addition, the linear parallel tubing is subject to scaling problems resulting from the precipitation of dissolved chemicals during the evaporation of water. Although a proper maintenance schedule prolongs the useful life of these evaporative condensers, the cost of the maintenance and downtime of the equipment increases the overall cost of such systems.

The use of a fiberglass housing in evaporative condensers provides significant advantages over the use of metal housings. A fiberglass housing offers an increased, almost indefinite, useful life with respect to the corrosive effects of the chemically rich residual water. A fiberglass construction is restricted because the fiberglass does not provide sufficient structural integrity for the large planar sections as used in the traditional rectangular evaporative condensers.

However, curved or cylindrical configurations of fiberglass do exhibit a sufficient structural rigidity to withstand the loading and stress of operating conditions. Therefore, the production of non-corroding cylindrical evaporative condenser housings is possible in a fiberglass construction. However, the use of the traditional linear condenser tubing within a cylindrical housing is not an efficient use of available space.

The production of cylindrical fiberglass shells lead to the development of spiral condensing coils. The spiral coils are employed in a concentric layered configuration within the cylindrical housing. However, the use of spiral condensing coils is subject to a variety of limitations. Because each spiral must be individually wound, the manufacture of spiral condensing coils is labor-intensive and therefore, expensive. Further, the current manufacturing techniques which employ the concurrent winding of tubing and a spacer cord do not ensure a uniformly-configured spiral. The unstable interface between the cord and the tubing causes frequent displacement of the cord, resulting in uneven spacing between adjacent revolutions of the spiral. In addition, the handling of the wound coils is cumbersome and often results in damage to the coil.

In order to maintain the desired spiral configuration of the condensing tube as it is installed into the evaporative condenser, the spacing between consecutive revolutions must be maintained. Specialized spacing bars, having recessed channels which engage a portion of the tubing are required to provide the necessary spacing between the revolutions. The spacer for each diameter tubing is unique, in that a particular spacer may only be used for a particular diameter condensing coil.

Further, the use of the spacers to maintain the designed spacing between adjacent layers of coils creates a large interface between the spacers and the coils, providing a thermal heat path therebetween. The heat path decreases the efficiency of the evaporative condenser.

Therefore, a need exists for an evaporative condenser having a cylindrical fiberglass housing capable of accommodating the thermal stresses induced by a plurality of concentrically oriented spiral condensing coils. Further, a need exists for self-supporting individual spiral condensing coils, capable of withstanding the stress of handling and thermal expansion without jeopardizing the configuration of the coil. A need also exists for the condenser tubing to be employed with a variety of refrigerant media, including vapor-liquid and liquid-liquid systems. Finally, the need exists for a non-labor-intensive method of producing spiral condensing coils having uniform spacing between consecutive revolutions, while providing for operative concentric stacking with other spiral coils.

SUMMARY OF THE INVENTION

The present invention provides an evaporative condenser having a cylindrical fiberglass housing, which encloses a carriage adapted to support a plurality of discrete spiral condensing coils in a concentric orientation. Further, a method and apparatus for producing planar spiral condensing coils having uniform spacing between adjacent revolutions and adjacent coil layers is disclosed. The disclosed evaporative condenser may be used in a vapor-liquid or a liquid-liquid refrigerant cycle. Therefore, the present invention may be employed to condense a vaporized refrigerant or to cool a heated liquid refrigerant such as water or a water-glycol mixture.

The fiberglass housing of the disclosed evaporative condenser provides a structure which is resistant to degradation from extended exposure to water and dissolved chemicals. The fiberglass construction also provides an improved durability with respect to the stress of environmental and induced temperature fluctuations. The cylindrical configuration of the housing also increases the efficiency of the evaporative condenser by providing a circumferential air intake. The circumferential air intake prevents the creation of a preferred air flow path, thereby increasing the efficiency of the coils.

The carriage retains a plurality of concentrically oriented spirals within the housing, and accommodates the induced thermal stresses exerted by the coils. The carriage also interacts with the coils to operably align the coils in a predetermined configuration so that an inlet and outlet manifold may be employed to link the plurality of coils to a common inlet and outlet manifold.

The disclosed method and apparatus for producing spiral evaporative condensing coils comprises a multi-tiered platform having a plurality of concentric circular tiers, wherein each tier has a smaller diameter than the tier upon which it rests. Preferably, the multi-tiered platform is disposed upon a rotatable table, which is driven at a predetermined angular velocity to wind the condensing tubing about the platform. The conical winding is then removed from the platform and compressed to a substantially planar configuration wherein radial supports are affixed to the revolutions of the spiral so as to produce a discrete layer, or bundle. Preferably, the radial supports provide sufficient spacing between adjacent layers of coils to allow an inlet or outlet to extend to the inner portion of the coil.

The disclosed method and apparatus produces individual, self-supporting spiral coil layers which are able to withstand the stresses of handling and operative loading without altering the spacing, or configuration of the spiral. The construction of the spiral coils from a conically-wound configuration produces spirals having evenly spaced revolutions, which provides for greater heat transfer efficiency. In addition, the use of tubular spacers between adjacent coil layers provides a reduced interface area between the adjacent layers which increases the efficiency of the coils.

BRIEF DESCRIPTION OF THE DRAWINGS

FIG. 1 is a partially cut-away perspective view of the evaporative condenser showing the location of the spiral condensing coils.

FIG. 2 is a perspective view of a conical winding of condensing tubing.

FIG. 3 is a side-elevational view of the apparatus for producing the conical winding of tubing showing a partial winding of the tubing.

FIG. 4 is a side-elevational view of the planar configuration of the spiral condensing coil showing the conical configuration in phantom.

DESCRIPTION OF THE PREFERRED EMBODIMENT

Figure 5:
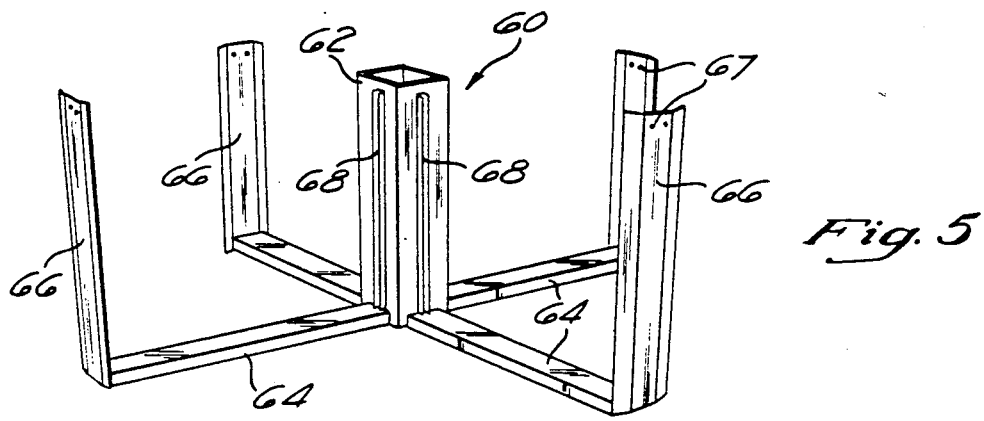
FIG. 5 is a perspective view of the carriage.

Referring to FIG. 1, an evaporative condenser 10 is shown, including a housing 20, a carriage 60, a spiral condensing coil 70 and a water distribution system 80.

Housing

Figure 6:
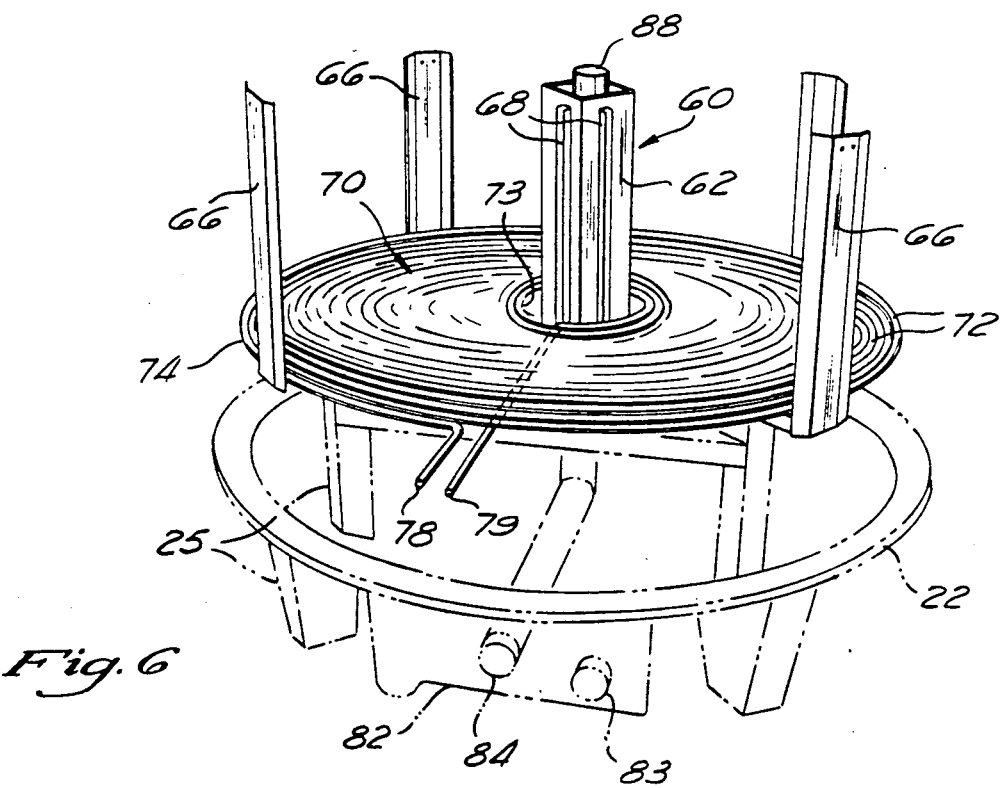
FIG. 6 is a perspective view of the carriage operably engaged with the base of the housing, showing a spiral condensing coil retained in the carriage.

As shown in FIG. 1, the fiberglass-reinforced polyester housing 20 includes a circular base 22, sized to support a cylindrical shell 24. Referring to FIG. 6, the base 22 includes an integral fluid reservoir 82 within the convex bottom of the base 22. The base 22 also includes a reservoir tap 83, fluidly connected to the reservoir 82, and a standpipe inlet 84 which is fluidly connected to a standpipe 88. A stand 25 extends from the base 22 to provide securing points for the carriage 60. The shell 24 secures to the top of the base 22 and extends upwardly in a cylindrical configuration. As shown in FIG. 1, the shell 24 includes a circumferential air inlet port 32 and an air outlet port 34 which is coaxial with the shell 24. The shell 24 supports a fan 26 proximal to the air outlet port 34.

Carriage

Figure 7:
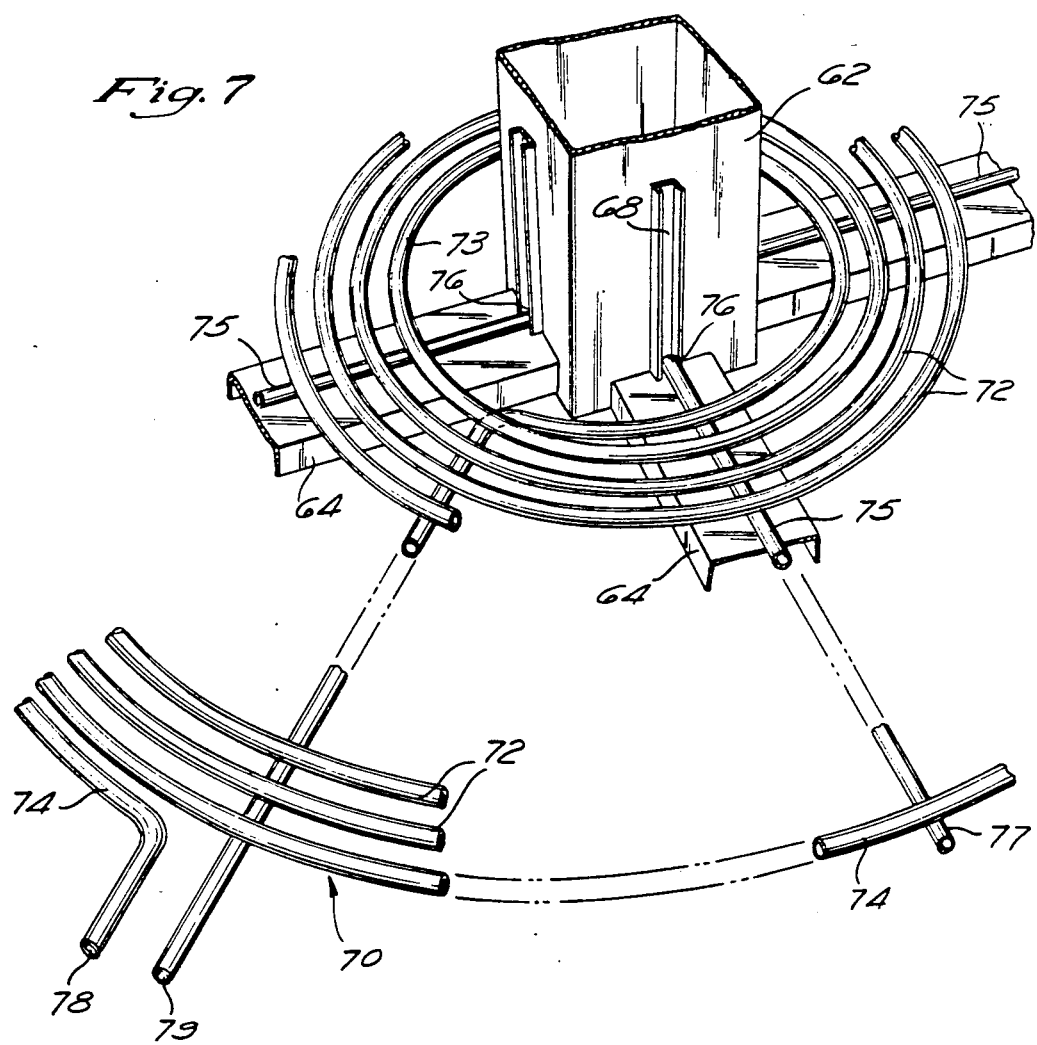
FIG. 7 is an enlarged perspective view of the operable engagement of a spiral condensing coil and the carriage.

Referring to FIG. 5, the carriage 60 includes a vertically oriented rectangular hollow core 62 having a radial spoke 64 perpendicularly extending from the bottom of each face of the core 62. Each spoke 64 terminates at a free end, from which an arm 66 perpendicularly extends, that is, the arm 66 is parallel to the core 62. Each arm 66 extends to the approximate height of the core 62. The arms 66 include apertures 67, which are sized to receive fasteners for securing the carriage 60 to the shell 24. As shown in FIGS. 5, 6 and 7, each face of the rectangular core 62 includes a vertically-oriented channel 68, which extends from the spoke 64 to the top of the core 62. Preferably, the carriage 60 is comprised of copper. The core 62 is formed by the 90° bending of a copper sheet at three equidistant intervals, to provide a closed loop configuration. The fourth corner of the core 62 is formed by brazing the copper along the length of the core 62, as is well known in the art. The spokes 64 are brazed to the core 62, the arms 66 are brazed to the spokes 64 and the channels 68 are brazed to the core 62. Brazing the joints provides sufficient structural integrity of the carriage 60 to support a plurality of condensing coils 70 under loaded stress.

Condensing Coil

As shown in FIGS. 6 and 7, the condensing coil 70 is of a substantially spiral configuration having a plurality of revolutions 72. The coil 70 is defined by an inner periphery 73 and an outer periphery 74, wherein an inlet port 78 and an outlet port 79 are disposed beyond the outer periphery 74. Although the inlet and outlet ports 78 and 79 define a refrigerant path from the outer periphery 74 to the inner periphery 73, the flow path may be reversed to provide a refrigerant path from the inner periphery 73 to the outer periphery 74. Referring to FIG. 7, the spiral coil 70 is affixed to four radially-extending braces 75. The braces 75 are affixed to the spiral 70 in the same orientation as the spokes 64. Each brace 75 is brazed to each revolution 72 the coil 70 as the brace tangentially contacts each revolution. Preferably, the braces 75 are comprised of the same diameter tubing as the coil 70. The braces 75 thereby permit the inlet and outlet ports 78, 79 to extend radially across the spiral 70, as shown in FIGS. 6 and 7. The inner end 76 of the brace 75 extends beyond the inner periphery 73 of the coil 70, and the outer end 77 of the brace 75 terminates proximal to the outer periphery 74. The braces fix each revolution 72 relative to the adjacent revolution, thereby providing structural rigidity to the coil 70. The spiral coil 70, having the four braces 75 brazed to the revolutions 72, is an individual, unitary layer for assembly within the evaporative condenser 10.

Water Distribution System

The water distribution system 80 disperses water within the housing 20 to wet the surfaces of the coils 70. As shown in FIG. 1, the reservoir 82 is fluidly connected to the standpipe inlet 84 through the reservoir tap 83 and the pump 86. The inlet 84 is fluidly connected to the standpipe 88 which extends vertically through the core 62 to fluidly connect the sprinklers 90 to the inlet 84. Preferably, the sprinklers 90 are rotatably mounted on the standpipe 88, and are positioned above the spiral coils 70. The sprinklers 90 include a plurality of nozzles which are oriented to cause the sprinkler 90 to rotate as water is dispersed on the coils 70.

Assembly of the Evaporative Condenser

As shown in FIG. 6, the carriage 60 is fastened to the stand 25 of the base 22. The desired number of spiral coils 70 are then positioned on the carriage 60. Referring to FIG. 7, as each coil 70 is placed on the carriage 60, the inner end 76 of the brace 75 engages the channel 68. Engagement of the inner end 76 within the channel 68 prevents movement of the spiral coil 70 relative to the carriage 60 and provides for a predetermined orientation of the coils 70 relative to the carriage 60. As subsequent coils 70 are retained in the carriage 60, the top side of each revolution 72 contacts the underside of the brace 75 of the subsequent layer. Because the braces have a predetermined orientation, the points of contact between adjacent layers of coil 70 are known prior to assembly. These points of contact are treated with a small amount of an elastomeric compound, such as silicone, to allow for relative movement of the coils 70 due to thermal stresses and loading forces. The tangential contact between adjacent layers of coils provides a reduced area of interface between the layers, thereby increasing the wetted surface area of the coils and the efficiency of the evaporative condenser 10. In addition, the alignment of a plurality of layers in the predetermined orientation disposes the inlet and outlet ports 78 and 79 along a common vertical axes, as shown in FIG. 1. An inlet manifold fluidly connects the plurality of inlet ports 78, and an outlet manifold fluidly connects a plurality of outlet ports 79 to provide a single entry and exit port for the refrigerant. The inlet and outlet manifolds may be disposed inside or outside of the shell 24. The shell 24 is then secured to the base 22, and bolts are passed through the aperture 67 of the arms 66 and through the shell 24 to affix the carriage 60 relative to the shell 24. The input and output refrigerant lines are connected to the manifolds, and water supply lines are connected to the reservoir ports.

Operation of the Evaporative Condenser

Vaporized refrigerant, or heated liquid refrigerant, enters the intake manifold and is distributed through the manifold to the inlet port 78 of the individual spiral condensing coils 70. The refrigerant travels radially inward through the spiral coil 70 to the inner periphery 73 and then exits through the outlet port 79 and the outlet manifold. The water distribution system 80 circulates water from the reservoir 82 by means of the pump 86, through the stand pipe inlet 84, the standpipe 88 and the sprinklers 90 to wet the surface of the coils 70. The fan 26 is adapted to draw air through the circumferential inlet 32 across the coils 70 and through the exhaust port 34 to provide evaporative cooling of the condensing coil 70. Water lost through evaporation is replaced through a water make-up valving system (not shown).

Manufacture of Condensing Coil

As shown in FIGS. 2, 3 and 4, the spiral condensing coil 70 is formed from a conical winding of tubing. The tubing is wound about a multi-tiered platform 100, which includes a plurality of circular tiers 102 concentrically oriented about an axis A. The diameter and vertical displacements of adjacent tiers 102 define the spacing of the revolutions 72. As shown in FIG. 3, adjacent tiers 102 of the platform 100 define substantially equal horizontal and vertical displacements, thereby providing for spiral coil 70 having uniformly spaced revolutions 72. As shown in FIG. 3, the platform 100 is affixed to a rotatable table 106, which includes rollers 107 adapted to permit rotation of the platform 100 about the concentric axis A.

Referring to FIG. 3, the tubing is affixed to the top of the multi-tiered platform 100 by friction of the winding, or, alternatively, the tubing may be clamped to the platform 100. The platform is then rotated about the axis A by the drive mechanism of FIG. 3, and the tubing is fed about descending tiers 102. The number of revolutions is determined by the design considerations of the evaporative condensers 10, such as, maximum heat transfer load, and the design wet bulb temperature at the location of operation.

Upon the winding of the desired number of revolutions 72, the condensing coil 70 is removed from the platform 100. Depending upon the diameter and material of the tubing, the conical winding may remain substantially conical, as shown in FIG. 2. The conical winding is then flattened into a planar configuration as shown in Figure, wherein the concentric revolutions nest to provide a spiral coil 70. As shown in FIGS. 4, 6 and 7, the outlet port 79 extends radially from the inner periphery 73, in contact with the revolutions 72 and terminates proximal to the inlet port 78 beyond the outer periphery 74. The braces 75 are then brazed to the condensing coil 70, as described supra.

Although the present invention has been described in terms of particular embodiments, it is not limited to these embodiments. Alternative embodiments and modifications which would be encompassed by the invention can be made by those skilled in the art, particularly in light of the foregoing teachings. Alternative embodiments, modifications or equivalents can be included within the spirit and scope of the invention as defined by the claims.

It is claimed:

1. An evaporative condenser, comprising:
   a housing having an air inlet port and an air outlet port;
   a condensing coil having a conically stressed planar spiral configuration wherein said spiral includes an inlet port and an outlet port;
   a fluid distribution system adapted to disperse a fluid on said condensing coil; and
   a carriage adapted to receive said coil, said carriage including a central core, said core adapted to be received within an inner periphery of said condensing coil, and a plurality of spokes extending from said core.

2. The evaporative condenser as defined in claim 1, further comprising at least one brace affixed to said spiral coil, said brace adapted to secure a plurality of revolutions of said spiral in said planar configuration.

3. The evaporative condenser as defined in claim 2, wherein said brace comprises a cylindrical tube which extends radially across said spiral condensing coil.

4. The evaporative condenser as defined in claim 3, wherein said tube is welded to said spiral condensing coil.

5. The evaporative condenser of claim 3, wherein said brace has a diameter equal to the diameter of the tubing of said condensing coil.

6. The evaporative condenser as defined in claim 1, wherein said water distribution system includes a pump to recirculate a portion of said dispersed fluid, a plurality of sprinklers fluidly connected to said pump, said sprinklers located above said spiral condensing coil, said sprinklers adapted to disperse fluid onto said spiral condensing coil.

7. The evaporative condenser of claim 1, wherein said spiral condensing coil is of a planar configuration formed by the compression of a conical winding of tubing.

8. The evaporative condenser of claim 3, wherein said core includes vertically oriented channels sized to receive an end of said brace thereby preventing rotation of said spiral condensing coil relative to said carriage.

9. The evaporative condenser of claim 1, further comprising a fan proximal to said air outlet port, said fan adapted to draw air from said air inlet port to said air outlet port.

10. The evaporative condenser of claim 1, wherein said fluid comprises substantially water.

11. The evaporative condenser of claim 1, wherein said inlet port and said outlet port of said condensing coil are disposed beyond an outer periphery of said spiral condensing coil.

12. The evaporative condenser of claim 1, wherein said carriage includes arms affixed to said spokes, said arms extending parallel to said core and adapted to engage said housing.

13. The evaporative condenser of claim 1, wherein said housing is substantially cylindrical.

14. The evaporative condenser of claim 13, wherein said air inlet port extends substantially about the periphery of said housing, and said air outlet port is concentrically located above said spiral condensing coil.

15. An evaporative condenser, comprising:
   a cylindrical housing having a circumferential air inlet port, and an axial air outlet port;
   at least one planar spiral condensing coil, the coil material having the structural characteristics resulting from having been formed by the compression of a conical winding of tubing to a common plane, said coil having an inner periphery, an outer periphery, an inlet port and an outlet port, said coil being sized to be received in said housing; and
   a fluid distribution system adapted to disperse fluid on said spiral condensing coil.

16. The evaporative condenser of claim 15, further comprising a brace affixed to said coil.

17. The evaporative condenser of claim 15, wherein said coils are concentrically oriented about a common core, and the points of contact between adjacent layers of said coils includes a resilient elastomer.

18. The evaporative condenser of claim 15, wherein said fluid distribution system includes a plurality of sprinkler nozzles fluidly connected to a fluid reservoir, said nozzles located above said condensing coil and adapted to wet the surface of said condensing coil.

19. An evaporative condenser, comprising:
   a cylindrical housing having a circumferential air inlet port, and an axial air outlet port;
   at least one planar spiral condensing coil formed by the compression of a conical winding of tubing to a common plane, said coil having an inner periphery, an outer periphery, an inlet port and an outlet port, said coil being sized to be received in said housing;
   a fluid distribution system adapted to disperse fluid on said coil; and
   a brace affixed to said coil, said brace extending radially across said condensing coil, and said brace having a first end within said inner periphery of said coil.

20. The evaporative condenser of claim 19, further comprising a carriage within said housing, said carriage adapted to support said coil and engage said first end of said brace.

* * * * *